(12) United States Patent
Kandasamy et al.

(10) Patent No.: US 8,255,431 B2
(45) Date of Patent: Aug. 28, 2012

(54) MANAGING MEMORY (75) Inventors: Madhusudanan Kandasamy, Bangalore (IN); Vidya Ranganathan, Bangalore (IN); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 12/623,738

(22) Filed: Nov. 23, 2009

(65) Prior Publication Data

US 2011/0125812 A1 May 26, 2011

(51) Int. Cl.
*G06F 17/00* (2006.01)
(52) U.S. Cl. ........ 707/807; 707/803; 707/802; 707/793; 707/966; 707/954
(58) Field of Classification Search .................. 707/954, 707/955, 960, 966, 792, 802, 803, 807
See application file for complete search history.

(56) References Cited

U.S. PATENT DOCUMENTS

| | | | |
|---|---|---|---|
| 6,477,612 B1 | 11/2002 | Wang | |
| 7,263,592 B2 | 8/2007 | Michael | |
| 7,461,148 B1 | 12/2008 | Beloussov et al. | |
| 7,653,910 B2 * | 1/2010 | Browning et al. | 718/107 |
| 2006/0010450 A1 | 1/2006 | Culter | |
| 2006/0059323 A1 | 3/2006 | Rao | |
| 2008/0294864 A1 | 11/2008 | Brenner et al. | |
| 2009/0094624 A1 | 4/2009 | Craft et al. | |
| 2010/0082816 A1 * | 4/2010 | Kharat et al. | 709/226 |
| 2010/0083283 A1 * | 4/2010 | Kharat et al. | 719/319 |

OTHER PUBLICATIONS

Chen, Ying; Hogstrom, Matt; Li, Ying, Liu, Tiancheng; Schofield, Andrew; Sun, Kewei; "Partition-based Heap Memory Management in an Application Server;" International Business Machines Corporation; p. 98; http://portal.acm.org/citation.cfm?id=1341331&dl=GUIDE&coll=GUIDE&CFID=60290756&CFTOKEN=94627828.

Berger, Emery D.; Zorn, Benjamin G.; "Die Hard: Probabilistic Memory Safety for Unsafe Languages;" PLDI'06 Jun. 11-14, 2006; 11pages; Ottawa, Ontario, Canada. http://www.hacker-soft.net/tools/Defense/fp014-berger.pdf.

Renouf, Colin; "More WAS Internals;" IBM Systems Magazine E-Newsletter Exclusive; Oct. 2007; 5pages; International Business Machines Corporation, USA. http://www.ibmsystemsmag.com.

Adve, Vikram; Lattner, Chris; "Transparent Pointer Compression for Linked Data Structures;" MSP 2005; Jun. 12, 2005; 32pgs; Powerpoint Slides http://llvm.org/pubs/2005-06-12-MSP-PointerCompSlides.ppt#11.

Kappel, Jason et al. Jul. 30, 2009; "Microsoft Virtualization with Hyper-V;" Abstract of Virtualization Overview; pp. 22-25; http://www.mhprofessional.com/downloads/products.0071614036/0071614093_chap01.pdf.

* cited by examiner

*Primary Examiner* — Sana Al Hashemi
(74) *Attorney, Agent, or Firm* — D'Ambrosio & Menon, PLLC (57) ABSTRACT

Methods, systems, and products for managing memory. In one general embodiment, the method includes assigning an isolated virtual heap in a global kernel heap of a global operating system environment to each of a plurality of isolated virtual operating system environments operating in a global operating system environment; and in response to an invocation of kernel heap memory allocation from one of the isolated virtual operating system environments, dynamically allocating memory to the invoking isolated virtual operating system environment from the virtual kernel heap assigned to the invoking isolated virtual operating system environment. The method may also include running the plurality of isolated virtual operating system environments in the global operating system environment. The plurality of isolated virtual operating system environments may share a single common kernel. The isolated virtual operating system environments may run under the same operating system image.

21 Claims, 4 Drawing Sheets

MANAGING MEMORY

BACKGROUND

Modern computing typically relies on applications running in a computing environment of an operating system ('OS'). The OS acts as a host for computing applications. The OS is responsible for the management and coordination of activities and the sharing of the resources of the computer. Techniques for allowing multiple OSs to run on a host computer concurrently have increased efficiency by decreasing the number of required machines.

Technologies for simultaneously running multiple execution environments on a single operating system have further increased efficiency by improving resource efficiency and facilitating observation of multiple systems simultaneously.

SUMMARY

Methods, systems, and computer products for managing memory are disclosed herein. Embodiments of the present disclosure may be initiated through a kernel interface. In one general embodiment, the method includes assigning an isolated virtual heap in a global kernel heap of a global operating system environment to each of a plurality of isolated virtual operating system environments operating in the global operating system environment; and in response to an invocation of kernel heap memory allocation from one of the isolated virtual operating system environments, dynamically allocating memory to the invoking isolated virtual operating system environment from the virtual kernel heap assigned to the invoking isolated virtual operating system environment. The method may also include running the plurality of isolated virtual operating system environments in the global operating system environment. The plurality of isolated virtual operating system environments may share a single common kernel. The isolated virtual operating system environments may run under a same operating system image.

Another general embodiment includes a computer program product disposed on a computer-readable medium for computer processing, the computer program product comprising computer program instructions for assigning an isolated virtual heap in a global kernel heap of a global operating system environment to each of a plurality of isolated virtual operating system environments operating in the global operating system environment; and in response to an invocation of kernel heap memory allocation from one of the isolated virtual operating system environments, dynamically allocating memory to the invoking isolated virtual operating system environment from the virtual kernel heap assigned to the invoking isolated virtual operating system environment.

Another general embodiment includes a data processing system for computer processing. The system includes a processor; and a computer memory operatively coupled to the processor. The computer memory has disposed within it computer program instructions for assigning an isolated virtual heap in a global kernel heap of a global operating system environment to each of a plurality of isolated virtual operating system environments operating in the global operating system environment; and in response to an invocation of kernel heap memory allocation from one of the plurality of isolated virtual operating system environments, dynamically allocating memory to the invoking isolated virtual operating system environment from the virtual kernel heap assigned to the invoking isolated virtual operating system environment.

The foregoing and other objects, features and advantages of the disclosure will be apparent from the following, more particular descriptions of exemplary embodiments of the invention as illustrated in the accompanying drawings wherein like reference numbers generally represent like parts of exemplary embodiments of the invention.

DETAILED DESCRIPTION

Exemplary methods, systems, and computer products for managing memory are described with reference to the accompanying drawings. The terminology used herein is for the purpose of describing particular embodiments only and is not intended to the limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium max be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
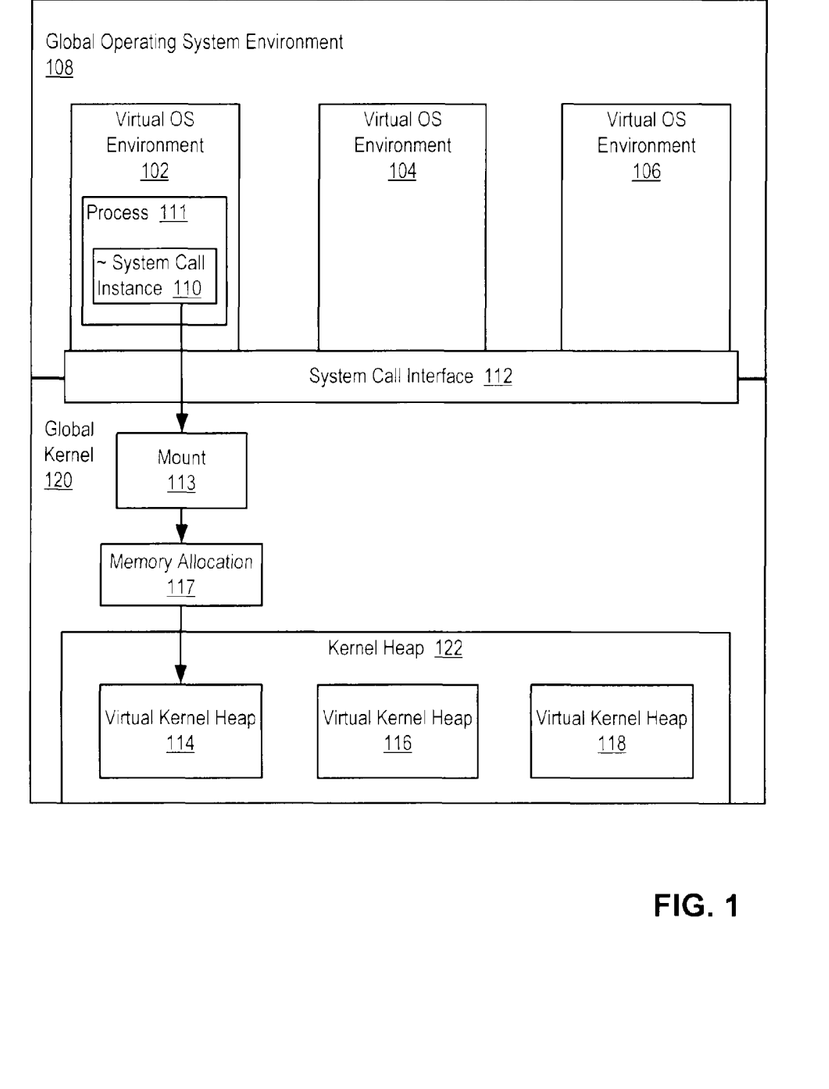
FIG. 1 illustrates a data flow diagram for the allocation of memory according to one or more embodiments of the invention.

FIG. 1 sets forth a diagram illustrating a software architecture according to embodiments of the present invention. Referring to FIG. 1, the software architecture 100 includes isolated virtual operating system environments 102, 104, 106. Virtual operating system environments 102, 104, 106 run in an instance of an operating system environment. e.g., global operating system environment 108, including global kernel 120. Virtual operating system environments 102, 104, 106 are isolated in the sense that, although, global operating system environment 108 may have access to all memory space, a virtual operating system environment 102, 104, 106 has access only to its own address space. Virtual operating system environments 102, 104, 106 are secure, private execution environments, and workload in one environment does not interfere with workload in another. A virtual operating system environment 102, 104, 106 may have its own set of unshared daemon processes (e.g., init, inetd, cron, etc.), resources (such as Inter-Process Communication ('IPC'), Workload Manager ('WLM'), filesystems, etc.), and so on. The isolated virtual operating system environments 102, 104, 106 may comprise dedicated writable file systems.

Virtual operating system environments 102, 104, 106 may each provide a user space that acts as a host for application programs that run on the computer. Application software may function within a virtual operating system environment without modification. The application will function as if it were running in its own "real" instance of an operating system. The application cannot determine that it is running within a virtual operating system environment. In some implementations, a single application installation in the global operating system environment is sufficient for any virtual operating system environment 102, 104, 106 to run it. An example of a virtual operating system environment includes AIX WPAR (International Business Machines, Armonk, N.Y.).

Applications running in user space may not have the capability to access resources directly. Global kernel 120 operates the core processes of the virtual operating system environments 102, 104, 106, manages hardware components, and allocates resources to applications running in the individual user space of the virtual operating system environments 102, 104, 106, as well as global operating system environment 108. Global kernel 120 provides the lowest level of abstraction layer between the virtual operating system environments 102, 104, 106 and the hardware resources of the computer, such as memory, processors, and input/output devices. Global kernel 120 is the only kernel for the virtual operating system environments 102. 104, 106, and is therefore shared between the virtual operating system environments 102, 104, 106 as a common kernel.

Processes running in virtual operating system environments 102, 104, 106, may invoke several system call instances during their execution. Each system call may be designed to perform a well-defined objective. For example, the instance of the mount system call 110 is designed to effect the mounting of a filesystem. The mount system call instance 110, upon being invoked by process 111, requests an implementation of the mount system call 113 in global kernel 120 through a system call interface 112. The system call interface 112 provides a software interface to services provided by the operating system and defines all the services of the operating system to processes running in a non-kernel space in virtual operating system environments 102, 104, 106, such as process 111. The system call interface 112 may include a system call table that has pointers to the functions that implement the system calls inside the global kernel 120. The system call table provides a well-defined interface to the operating system services.

One or more of these system calls, such as, for example, the mount system call 113, may require memory allocation to store data. The mount system call 113, or any other system call or other kernel code, may request the dynamic allocation of memory. In response, memory is allocated from the virtual kernel heap.

The memory allocation function 117 dynamically allocates memory from a global kernel heap 122 in global kernel memory. Global kernel heap 122 contains isolated virtual heaps 114, 116, 118. Each virtual heap 114, 116, 118 comprises dedicated memory that is allocated from a separate group of segments from kernel address space. Each virtual heap 114, 116, 118 is assigned to a virtual operating system environment 102, 104, 106, so that each virtual operating system environment 102, 104, 106 has a virtual heap 114, 116, 118 from which memory may be allocated. For example, virtual heap 114 is assigned to virtual operating system environment 102, virtual heap 116 is assigned to virtual operating system environment 104, and virtual heap 118 is assigned to virtual operating system environment 106.

Upon the invocation of system call instance 110 from virtual operating system environment 102, the system call interface 112 executes a mount function 111 in the global kernel that requests dynamic memory allocation by calling memory allocation function 117. Upon the invocation of the memory allocation function 117 from within the global kernel 120, the memory allocation function 117 dynamically allocates memory to virtual operating system environment 102 from the virtual heap 114 that has been assigned to virtual operating system environment 102.

Memory allocation function 117 may detect that system call instance 110 is invoked from the virtual operating system environment 102 and execute a separate code section allocating memory from virtual kernel heap 114. Although the mount system call 113 calling mount function 111 is illustrated in the present example, generally, any system call or other kernel code may allocate the memory within kernel.

The global operating system environment 108 can be hosted within a logical partition, such as LPAR from International Business Machines Corporation (Armonk, N.Y.), which may consist of either dedicated or shared processors, as well as virtual or physical I/O. The logical partition may be one of many on a particular system. Each logical partition may be running a different operating system, or the global operating system environment 108 may be one of multiple global operating system environments, with each global operating system on a different partition and multiple virtual operating system environments on each global operating system environment. The global operating system environment 108 owns all system resources (i.e., CPU, memory, I/O). FIG. 1 shows three virtual operating system environments. In alternative embodiments, a global operating system environment 108 may contain tens, hundreds, or thousands of virtual operating system environments (for example, 8.192).

Figure 2:
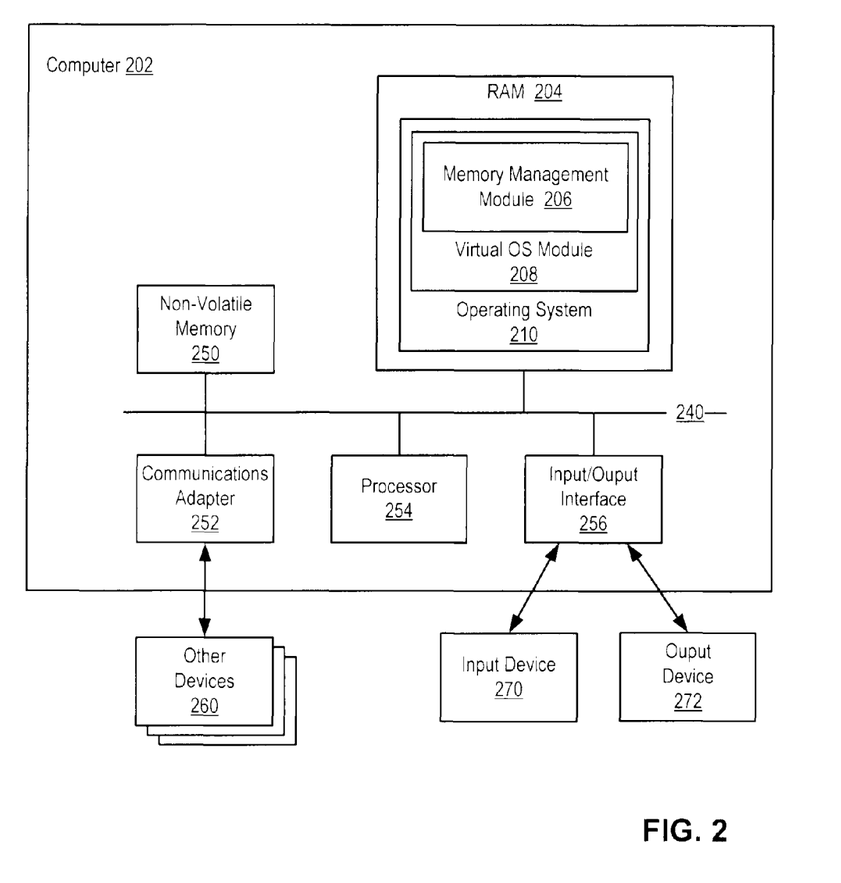
FIG. 2 illustrates a block diagram of an exemplary computer in accordance with one embodiment of the invention.

Embodiments of the presently disclosed invention are implemented to some extent as software modules installed and running on one or more data processing systems ('computers'), such as servers, workstations, tablet computers. PCs, personal digital assistants ('PDAs'), smart phones, and so on. FIG. 2 sets forth a block diagram of an exemplary computer 202. Computer 202 includes at least one computer processor 254 as well as a computer memory, including both volatile random access memory ('RAM') 204 and some form or forms or non-volatile computer memory 250 such as a hard disk drive, an optical disk drive, or an electrically erasable programmable read-only memory space (also known as 'EEPROM' or 'Flash' memory). The computer memory may be connected through a system bus 240 to the processor 254 and to other system components. Thus, the software modules may be program instructions stored in computer memory.

An operating system 210 is stored in computer memory. Operating system 210 may be any appropriate operating system such as Windows XP, Windows Vista, Mac OS X, UNIX, LINUX, Sun Microsystems's Solaris, or AIX from International Business Machines Corporation (Armonk, N.Y.).

Computing device 202 may also include one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 may also include a communications adapter 252 for implementing data communications with other devices 260. Communications adapter 252 implements the hardware level of data communications through which one computer sends data communications to another computer through a network.

Also stored in computer memory is memory management module 206, which may operate at least partially in kernel mode. The memory management module 206 includes computer program instructions for enabling memory management as described herein. File module may include computer program instructions for assigning an isolated virtual heap in a global kernel heap to each of a plurality of isolated virtual operating system environments operating in a global operating system environment. The module may also include computer program instructions for dynamically allocating memory to an isolated virtual operating system environment from the virtual kernel heap assigned to the invoking isolated virtual operating system environment, in response to an invocation of kernel heap memory allocation from one of the isolated virtual operating system environments.

The memory management module 206 may be incorporated in a virtual operating system module 208. The virtual operating system module 208 includes computer program instructions for running a plurality of isolated virtual operating system environments in a global operating system environment.

Memory management module 206 may be implemented as one or more sub-modules operating in separate software layers or in the same layer. Although depicted as being incorporated into the virtual operating system module in FIG. 2, the memory management module 206 or one or more sub-modules making up the memory management module 206 may be separate from the virtual operating system module 208. In particular, invocations of dynamic memory allocation may be implemented in the operating system 210 or in high-level code, such as application code. In some embodiments, the memory management module 206 may be implemented in the software stack, in hardware, in firmware (such as in the BIOS), or in any other manner as will occur to those of ordinary skill in the art.

Figure 3A:
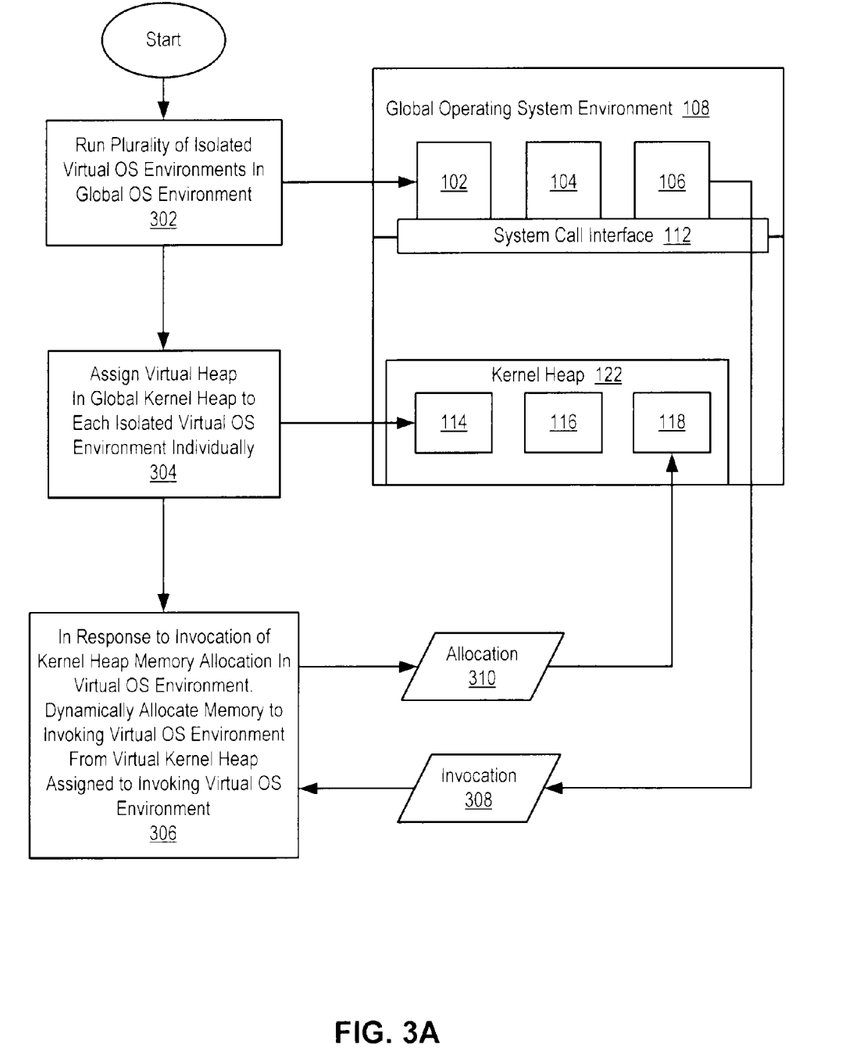
FIGS. 3A and 3B are data flow diagrams illustrating a method for memory management in accordance with one or more embodiments of the invention.

FIG. 3A is a data flow diagram illustrating a method for memory management in accordance with one embodiment of the invention. The method of FIG. 3A includes running a plurality of isolated virtual operating system environments 102, 104, 106 in a global operating system environment 108 (block 302); and assigning an isolated virtual heap 114, 116, 118 in the global kernel heap 122 to each of the isolated virtual operating system environments 102, 104, 106 individually (block 304). Running the plurality of isolated virtual operating system environments 102, 104, 106 in the global operating system environment 108 (block 302) may be carried out by running the plurality of isolated virtual operating system environments 102, 104, 106 under the same OS image.

Assigning an isolated virtual heap 114, 116, 118 in the global kernel heap 122 to each of the isolated virtual operating system environments 102, 104, 106 individually (block 304) may include creating the isolated virtual heap 114, 116, 118 in the global kernel heap 122 for each of the isolated virtual operating system environments 102, 104, 106 individually. The system may assign a virtual kernel heap 114, 116, 118 upon system initialization, on creation of a virtual operating system environment 102, 104, 106, upon receiving a specific command to do so, or at any other time as will occur to those of skill in the art. The size of a virtual heap 114, 116, 118 created on creation of virtual operating system environments 102, 104, 106 may be tunable at time of initialization. Creating a virtual heap 114, 116, 118 may include allocating segments from kernel heap 122 as virtual heap 114, 116, 118 and storing the address as pointers in a record. Alternatively, creating a virtual heap 114, 116, 118 may be carried out by delineating, specifically or through an addressing scheme, memory as available only to a specific virtual operating system environment. In some embodiments, the memory allocation function 117 creates and assigns virtual heaps in advance. In other embodiments, the memory allocation function 117 can dynamically determine which part of the global heap corresponds to the requesting virtual operating system. The memory allocation function 117 may calculate memory addresses based on a virtual operating system environment identifier stored within the process control block ('PCB').

In response to an invocation 308 of kernel heap memory allocation from one of the isolated virtual operating system environments 102, 104, 106, the system dynamically allocates memory to the invoking isolated virtual operating system environment 106 from the virtual kernel heap 118 assigned to the invoking isolated virtual operating system environment 106 (block 306). Allocating memory to the invoking isolated virtual operating system environment 106 from the virtual kernel heap 118 may be carried out by allocating a block of memory of a configurable size and returning a pointer indicating the beginning of the block.

Figure 3B:
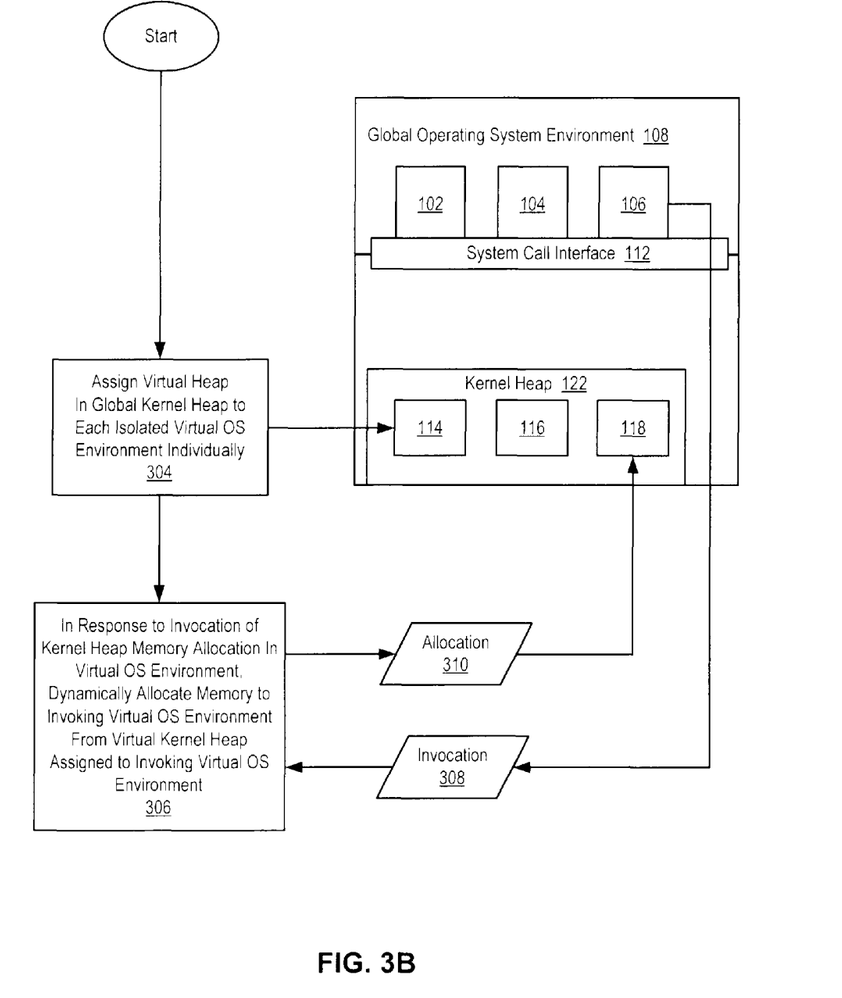

FIG. 3B is a data flow diagram illustrating a method for memory management in accordance with another embodiment of the invention. Referring to FIG. 3B, the method comprises assigning an isolated virtual heap 114, 116, 118 in the global kernel heap 122 to each of a plurality of isolated virtual operating system environments 102, 104, 106 individually (block 304); and, in response to an invocation 308 of kernel heap memory allocation 310 from one of the isolated virtual operating system environments 106, dynamically allocating memory to the invoking isolated virtual operating system environment 106 from the virtual kernel heap 118 assigned to the invoking isolated virtual operating system environment (block 306).

The method of FIG. 3B is carried out similarly to FIG. 3A, but forgoes running isolated virtual operating system environments, which is carried out separately. The method of FIG. 3B may be performed after running a plurality of isolated virtual operating system environments in a global operating system environment single language indexing step has been initiated.

As discussed above with reference to FIG. 1, global kernel 120 may invoke memory allocation from the kernel heap by executing code comprising an instance of a call to a memory allocation function in the kernel. One such function call is an xmalloc( ) call: xmalloc( ) is function within the kernel which may be invoked by any system call or from any other parts of the kernel to allocate memory. The de-allocation of memory may be similarly effected through xmfree( ) calls. In some embodiments, a virtual operating system environment memory subsystem may have its own programming interface to request and free memory for different purposes. Consider the following exemplary code section of a system call in global kernel 120 for illustration.
xmalloc(128,4, kernel_heap)

The xmalloc function typically allocates an area of memory out of the heap specified by the heap parameter. In this example, the heap parameter specifies kernel heap. Thus, the code section is written to employ the xmalloc kernel service available from a standard operating system kernel to allocate heap from the kernel heap. The specified area is defined by the number of bytes in length (128 bytes) specified by the size parameter and the alignment on the byte boundary specified by the align parameter. The align parameter is actually the log base 2 of the desired address boundary. For example, the align value of 4 requests that the allocated area be aligned on a $2^4$ (16) byte boundary.

In embodiments of the present disclosure, the system detects that a virtual operating system environment has invoked a system call that includes an instance of xmalloc and that kernel heap has been specified. Detecting that the system call calling the instance of xmalloc has been invoked by a virtual operating system environment may be carried out by the use of a flag or by the presence of a specific partition identifier ('partition ID'), or by any other method as will occur to those of skill in the art.

In response to detecting the virtual operating system environment, the system may identify the virtual operating system environment and call a function that allocates memory in the virtual heap assigned to the identified virtual operating system environment. For example, the kernel interface may obtain the partition ID from the PCB, and call the function vxmalloc( ) passing the partition ID and the original parameters from the xmalloc( ) call as arguments. The vxmalloc( ) function may obtain the partition ID from the PCB and allocate memory from the virtual kernel assigned to the virtual operating system environment by performing a lookup with the partition ID.

Figure 4:
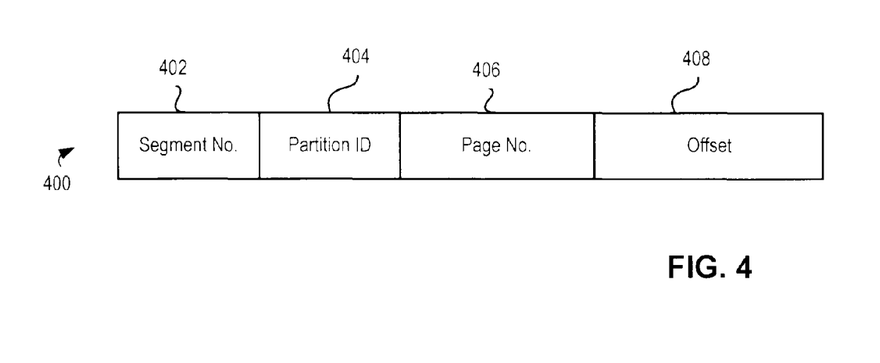
FIG. 4 illustrates a virtual addressing system according to one or more embodiments of the invention.

In an alternative framework, addressing may be keyed to the partition ID. FIG. 4 illustrates a virtual addressing system according to embodiments of the invention. The virtual addressing system includes 32-bit address space, with up to 16 segments of up to 256 MB. The address consists of a segment number (4 bits) 402, a partition ID (bits) 404, a page number (11 hits) 406, and an offset 408 within the page (12 hits). The third segment is reserved as the kernel heap segment. Thus, for a kernel heap address, the value in the segment number is 0011. This addressing system supports 32 virtual operating system environments. The third segment is divided into 32 sub-segments of equal size. By using the partition ID of the virtual operating system environments to delineate memory space, the virtual address space for each virtual operating system environment can be ensured simply by inserting the partition ID into the 32 hit virtual address pointing to the virtual kernel heap. Thus, by implementing the virtual addressing system, the memory space corresponding to each partition ID is assigned to virtual operating system environment associated with the partition ID. The detection and identification of the virtual operating system environment may be implemented in many other ways, and may be carried out in the kernel, the kernel interface, or in user space.

In some embodiments, the system may be configured to free allocated virtual memory upon invocation of the xmfree kernel service from a virtual operating system environment in a similar manner. For example, a kernel function vxmfree could be called to free the memory from the virtual heap according to the VOS ID.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for managing memory comprising:
   assigning an isolated virtual heap in a global kernel heap of a global operating system environment to each of a plurality of isolated virtual operating system environments operating in the global operating system environment; and
   in response to an invocation of kernel heap memory allocation for one of the isolated virtual operating system environments, dynamically allocating memory to the invoking isolated virtual operating system environment from the virtual kernel heap assigned to the invoking isolated virtual operating system environment.

2. A computer program product for managing memory, the computer program product comprising:
   a computer readable storage medium having computer readable program code embodied therewith, the computer usable program code comprising:
   computer readable program code configured to assign an isolated virtual heap in a global kernel heap of a global operating system environment to each of a plurality of isolated virtual operating system environments operating in the global operating system environment; and
   computer readable program code configured to, in response to an invocation of kernel heap memory allocation for one of the plurality of isolated virtual operating system environments, dynamically allocate memory to the invoking isolated virtual operating system environment from the virtual kernel heap assigned to the invoking isolated virtual operating system environment.

3. A system for managing memory, the system comprising:
   a processor; and
   a computer memory operatively coupled to the processor, the computer memory having disposed within it:
   computer readable program code configured to assign an isolated virtual heap in a global kernel heap of a global operating system environment to each of a plurality of isolated virtual operating system environments operating in the global operating system environment; and
   computer readable program code configured to, in response to an invocation of kernel heap memory allocation from one of the plurality of isolated virtual operating system environments, dynamically allocate memory to the invoking isolated virtual operating system environment from the virtual kernel heap assigned to the invoking isolated virtual operating system environment.

4. The method of claim 1 wherein assigning the isolated virtual heap in the global kernel heap comprises creating the isolated virtual heap in the global kernel heap for each of the isolated virtual operating system environments individually.

5. The method of claim 1 wherein running the plurality of isolated virtual operating system environments in the global operating system environment comprises running the plurality of isolated virtual operating system environments under a same operating system image.

6. The method of claim 1 wherein the plurality of isolated virtual operating system environments share a single common kernel.

7. The method of claim 1 wherein the invocation comprises a call to a kernel function.

8. The method of claim 1, the dynamically allocating memory to the invoking isolated virtual operating system environment comprising:
   identifying the virtual kernel heap assigned to the invoking isolated virtual operating system environment using a partition ID associated with the invoking isolated virtual operating system environment; and
   dynamically allocating memory to the invoking isolated virtual operating system environment from the identified virtual kernel heap.

9. The computer program product of claim 2 wherein the computer readable program code configured to assign the isolated virtual heap in the global kernel heap comprises computer readable program code configured to create the isolated virtual heap in the global kernel heap for each of the isolated virtual operating system environments individually.

10. The computer program product of claim 2 wherein the computer readable program code configured to run the plurality of isolated virtual operating system environments in the global operating system environment comprises computer readable program code configured to run the plurality of isolated virtual operating system environments under a same operating system image.

11. The computer program product of claim 2 wherein the plurality of isolated virtual operating system environments share a single common kernel.

12. The computer program product of claim 2 wherein the isolated virtual operating system environments comprise dedicated writable file systems.

13. The computer program product of claim 2, the computer readable code configured to dynamically allocate memory to the invoking isolated virtual operating system environment comprising:
   computer readable program code configured to identify the virtual kernel heap assigned to the invoking isolated virtual operating system environment using a partition ID associated with the invoking isolated virtual operating system environment; and
   computer readable program code configured to dynamically allocate memory to the invoking isolated virtual operating system environment from the identified virtual kernel heap.

14. The system of claim 3 wherein the computer readable program code configured to assign the isolated virtual heap in the global kernel heap comprises computer readable program code configured to create the isolated virtual heap in the global kernel heap for each of the plurality of isolated virtual operating system environments individually.

15. The system of claim 3 wherein the computer readable program code configured to run the plurality of isolated virtual operating system environments in the global operating system environment comprises computer readable program code configured to run the plurality of isolated virtual operating system environments under a same operating system image.

16. The system of claim 3 wherein the plurality of isolated virtual operating system environments share a single common kernel.

17. The system of claim 3 wherein the invocation comprises a call to a kernel function.

18. The system of claim 3, the computer readable code configured to dynamically allocate memory to the invoking isolated virtual operating system environment comprising:
   computer readable program code configured to identify the virtual kernel heap assigned to the invoking isolated virtual operating system environment using a partition ID associated with the invoking isolated virtual operating system environment; and computer readable program code configured to dynamically allocate memory to the invoking isolated virtual operating system environment from the identified virtual kernel heap.

19. The method of claim 8, the identifying the virtual kernel heap assigned to the invoking isolated virtual operating system environment comprising:

performing a lookup of a virtual address space comprising a plurality of virtual addresses, each virtual address comprising a predefined number of bits including a first set of bits representing a segment with which the virtual address is associated, a second set of bits representing a partition ID, a third set of bits representing a page number of the virtual address, and a fourth set of bits representing an offset within the page number; and locating, within the virtual address space, an address space comprising one or more virtual addresses, the first set of bits of each of the one or more virtual addresses of the address space comprising a value associated with the kernel heap and the second set of bits of each of the one or more virtual addresses of the address space comprising the partition ID associated with the invoking isolated virtual operating system environment, wherein the located address space corresponds to the virtual kernel heap assigned to the invoking isolated virtual operating system environment.

20. The computer program product of claim 13, the computer readable program code configured to identify the virtual kernel heap assigned to the invoking isolated virtual operating system environment comprising:

computer readable program code configured to perform a lookup of a virtual address space comprising a plurality of virtual addresses, each virtual address comprising a predefined number of bits including a first set of bits representing a segment with which the virtual address is associated, a second set of bits representing a partition ID, a third set of bits representing a page number of the virtual address, and a fourth set of bits representing an offset within the page number; and computer readable program code configured to locate, within the virtual address space, an address space comprising one or more virtual addresses, the first set of bits of each of the one or more virtual addresses of the address space comprising a value associated with the kernel heap and the second set of bits of each of the one or more virtual addresses of the address space comprising the partition ID associated with the invoking isolated virtual operating system environment, wherein the located address space corresponds to the virtual kernel heap assigned to the invoking isolated virtual operating system environment.

21. The system of claim 18, the computer readable program code configured to identify the virtual kernel heap assigned to the invoking isolated virtual operating system environment comprising:

computer readable program code configured to perform a lookup of a virtual address space comprising a plurality of virtual addresses, each virtual address comprising a predefined number of bits including a first set of bits representing a segment with which the virtual address is associated, a second set of bits representing a partition ID, a third set of bits representing a page number of the virtual address, and a fourth set of bits representing an offset within the page number; and computer readable program code configured to locate, within the virtual address space, an address space comprising one or more virtual addresses, the first set of bits of each of the one or more virtual addresses of the address space comprising a value associated with the kernel heap and the second set of bits of each of the one or more virtual addresses of the address space comprising the partition ID associated with the invoking isolated virtual operating system environment, wherein the located address space corresponds to the virtual kernel heap assigned to the invoking isolated virtual operating system environment.

* * * * *